United States Patent [19]
Gesink et al.

[11] Patent Number: 5,803,740
[45] Date of Patent: Sep. 8, 1998

[54] LEARNING AND ASSESSMENT AID FOR A SEVERELY VISUALLY IMPAIRED INDIVIDUAL

[75] Inventors: John Gesink, Kalamazoo; David Guth, Portage; Bernard Fehr, Okemos, all of Mich.

[73] Assignee: Board of Trustees of Western Michigan University, Kalamzoo, Mich.

[21] Appl. No.: 837,660

[22] Filed: Apr. 22, 1997

[51] Int. Cl.⁶ .................................................. G08B 13/00
[52] U.S. Cl. ........................... 434/112; 434/116; 704/271
[58] Field of Search .................................. 434/112, 116; 135/72; 704/271, 270; 367/116, 107

[56] References Cited

U.S. PATENT DOCUMENTS

| | | |
|---|---|---|
| 4,212,116 | 7/1980 | Hajduch . |
| 4,870,687 | 9/1989 | DeLeon .................................... 367/116 |
| 4,906,193 | 3/1990 | McMullen et al. . |
| 5,032,083 | 7/1991 | Friedman . |
| 5,032,836 | 7/1991 | Ono et al. . |
| 5,097,856 | 3/1992 | Sheng ........................................ 135/72 |
| 5,120,228 | 6/1992 | Stahl et al. . |
| 5,144,294 | 9/1992 | Alonzi et al. . |
| 5,409,380 | 4/1995 | Balbuena et al. . |
| 5,470,233 | 11/1995 | Fructerman et al. . |
| 5,487,669 | 1/1996 | Kelk ........................................ 434/112 |
| 5,508,699 | 4/1996 | Silverman . |

OTHER PUBLICATIONS

Goldish, *A Hand–Held Inertial Navigation Aid For The Blind Thesis*, Massachusetts Institute of Technology, Apr. 1965.

LaDuke, *The Veering Tendency of Blind Pedestrians: An Analysis of the Problem and Literature Review*, Sep–Oct, 1994, pp. 391–400.

Cratty, *Movement And Spatial Awareness In Blind Children and Youth*, 1971, pp. 65–80.

*Primary Examiner*—Richard J. Apley
*Assistant Examiner*—Glenn Richman
*Attorney, Agent, or Firm*—Flynn, Thiel, Boutell & Tanis, P.C.

[57] ABSTRACT

A learning and assessment aid (10) for helping visually impaired individuals develop desirable ambulatory motion habits. The learning aid includes a housing (14) designed to be attached to an article of clothing worn by the individual. Internal to the housing is an inertial transducer (16) that monitors the rotation of the housing and the individual. The individual enters commands to the learning aid through a keypad (20) in response to audible instructions generated over a speaker (22). To foster desirable turning motions, the learning aid informs of the extent to which the individual turns. To foster straight-line walking, the learning aid generates a message over the speaker whenever the individual rotates more than a pre-set individual-entered maximum veer.

25 Claims, 13 Drawing Sheets

LEARNING AND ASSESSMENT AID FOR A SEVERELY VISUALLY IMPAIRED INDIVIDUAL

FIELD OF THE INVENTION

This invention relates to a learning and assessment aid for an individual with a severe visual impairment and, more particularly, to a learning and assessment aid designed to provide information regarding the locomotion of the individual that can be used as a guide to foster desirable walking habits.

BACKGROUND OF THE INVENTION

An individual who is blind must use his/her senses to accomplish many of the activities of living that sighted persons take for granted. Two such activities related to pedestrian travel are those of walking in a desired direction and turning in a desired direction. Sighted individuals easily and accurately accomplish these activities on the basis of visual guidance. However, many individuals who are blind find these tasks difficult to accomplish accurately on the basis of nonvisual information. Therefore, a component of the instruction of a severely visually impaired or blind individual can include attempts to teach the individual to maintain a straight-line trajectory while walking and to make accurate turns, such as right angle turns one may wish to make at a street corner.

This instruction requires both a means of assessing an individual's ability to engage in such locomotion and a means for improving these abilities. One such learning system has the individual attempt to walk in a straight path and then requires the bending of a wire into the approximate shape of the path that the individual actually traversed. The individual then feels the wire to develop an impression of the extent his/her locomotion strayed from the straight line path. One disadvantage is that it requires a sighted individual to accurately judge the walked path and to then bend the wire accordingly. This method further requires that the visually impaired individual be able to relate the small bent wire to his/her earlier walking trajectory.

There have also been efforts to teach visually impaired individuals how to walk in a straight line by setting up in a lane in an open area that is bordered by optical beams. Sensors monitor the state of these beams. In the event the individual while walking moves to one side or the other of the center of the lane, veering from straight line motion, the individual's legs break one of the optical beams. The broken beam is detected by the complementary sensor which in turn generates a signal that causes the assertion of an audio alarm. Initially, the beams defining the lane may be spaced relatively wide apart. Over time, as the individual's veer is reduced, the distance between the beam is reduced in order to further provide guidance for reducing an individual's veer. A disadvantage of this system is that each time the lanes are set up, they need to be set up for the particular individual with whom they are to be used. Consequently, orientation and mobility instructors working with the blind individual must spend significant amounts of time aligning the beams so that they can be used for a particular individual. Still another disadvantage of these training systems is that, while they are useful for teaching a person to walk in a straight line, they are not well suited for providing guidance for helping a person learn how to turn.

In the past, it has been proposed that persons could learn how to minimize their veer with the aid of an inertial motion sensor such a gyroscope. One such gyroscope proposed was designed to be held by an individual as he/she tries to walk along a straight line path-of-travel. If the individual veers right or left from the straight line, a solenoid is energized so as to cause the extension of a small plunger; the tactile sensation of feeling the plunger extend serves as the indication to the individual that he/she has veered from the desired straight line path-of-travel.

While the previously proposed inertial motion sensor training device has shown promise as an aid for training the blind, its utility is likewise limited. An individual using this device is required to walk with one of his/her arms in a bent position in order to be sure that the device is properly oriented and the individual can monitor the extended/retracted state of the plungers. Thus, in order to use this device the individual is require to walk in a manner different from which he/she would normally walk. Consequently, an individual using this device has to concentrate on more than just the skills required to walk in a straight line; the individual also has to devote some concentration to the muscle control required to properly hold the training device. Moreover, it would be difficult to use this device as an aid to walking in a straight line with a cane since the individual would have to perform two different, uncoordinated movements with his/her arms. Also, the previously proposed gyroscopic training device only provides an indication of veer once an individual's movement exceeds a given angle. Still other limitations of the known inertial sensor learning aid is that it does not provide an indication of the distance the individual has traveled and is not particularly useful for helping an individual learn how to execute turns.

Moreover, as discussed above, a prerequisite to teaching an individual to develop desirable locomotion habits is the collection of baseline data about his/her initial locomotion habits. This information is used by the instructor to evaluate the locomotion habits of the individual so that a training regime can be developed as well to serve as baseline data so that progress of the individual can be monitored. While the prior art learning aids are useful for helping an individual develop desirable locomotion habits, only with great difficulty can they be used to facilitate the collection of data about the individual requiring such training.

SUMMARY OF THE INVENTION

This invention relates generally to a new and useful learning and assessment aid useful for helping an individual with a severe visual impairment develop appropriate locomotion habits. The learning and assessment aid is useful for collecting data regarding locomotion habits. The learning and assessment aid also provides a visually impaired individual with indications regarding his/her ability to both walk in a straight line and to execute turns. More particularly, this invention relates generally to a learning and assessment aid that includes one or more inertial movement sensors that, at a minimum, provide an indication of the extent to which a person rotates his/her orientation from an initial heading. In one preferred version of this invention, a two-gimbal gyroscope is employed as the inertial movement sensor.

The learning and assessment aid of this invention is further designed so that the gyroscope or other sensor is contained in a small housing. The housing is provided with a pivoting clasp that allows the housing to be affixed to an article of clothing worn by an individual so as to ensure the proper orientation of the sensor. The output signals produced by the sensor are applied to a digital signal processing unit. Based on the movement of the gyroscope, the digital signal processing unit determines the extent to which the housing has changed position. This measurement is used as the basis for providing an indication of the extent the individual wearing the learning and assessment aid has rotated from his/her initial position. The learning and assessment aid also has an alphanumeric display and a speech generator. The digital signal processing unit causes audio announcements to be generated that both instruct the individual how to set the device and that provide an indication of whether or not the individual has completed his/her intended movement.

The learning and assessment aid of this invention is further configured to provide an indication of the total distance traversed by the individual. In some versions of this invention, this measurement is a time based-measurement that relates the time of use of the aid and the individual's rate of travel to the distance traveled.

When there is a need to collect data about the locomotion habits of an individual, the aid is placed in the data collection mode. The aid generates a set of audible instructions directing the individual to walk in a certain pattern, i.e., straight-line or turn. The aid then collects data regarding the movement for a select period of time. Once the aid stops collecting data, the aid generates an audible command instructing the individual to stop moving. The data collected is then available to the instructor working with the individual.

When the learning and assessment aid of this invention is used as a tool to foster straight-line movement, the individual can indicate the specific degree of veer that is allowed before a warning tone is generated. The individual can also input an indication of the distance of travel over which the veer should be measured. The learning and assessment aid of this invention can also be used as a tool to foster turning movement. Specifically, the individual can provide an indication that he/she wants to practice turning. Then, once the individual completes a turn, the learning and assessment aid will generate a message that provides an indication of the extent of the turn.

Since this learning and assessment aid is worn on the body, once the instructions regarding the individual's intended movement are entered, the individual can essentially ignore the presence of the aid. This allows the individual to focus his/her attention on the more important task at hand, executing the intended ambulatory movement.

BRIEF DESCRIPTION OF THE DRAWINGS

This invention is pointed out with particularity in the claims. The above and further advantages of this invention may be better understood by referring to the following description taken in conjunction with the accompanying drawings in which:

DETAILED DESCRIPTION

Figure 1:
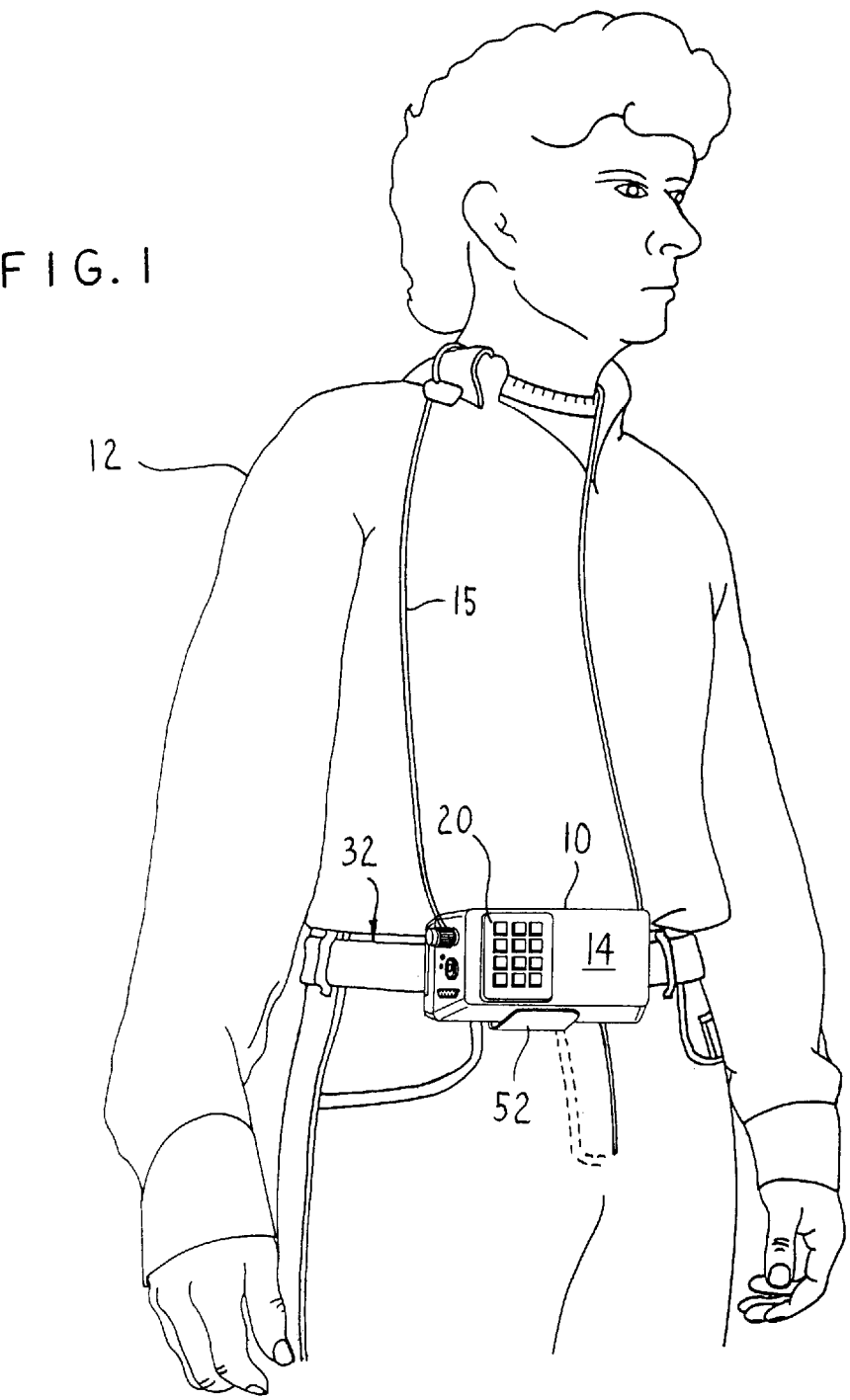
FIG. 1 is a perspective view illustrating the inertial movement sensor learning and assessment aid of this invention and illustrating how the aid is worn by an individual.

FIGS. 1–4 illustrate a learning and assessment aid 10 of this invention and how the aid is worn by a visually impaired individual 12. The learning and assessment aid 10 includes a housing 14 in which the internal components of the learning and assessment aid are enclosed. Inside the housing 14 are a gyroscope 16 and a microprocessor 18. The gyroscope 16 functions as an inertial movement sensor that produces signals representative of the shifting of the learning and assessment aid 10, as well as the individual wearing the learning and assessment aid, from an initial position. The microprocessor 18 receives signals based on those produced by the gyroscope 16 and, in response, generates output signals that provide an indication of the individual's movement.

Figure 2:
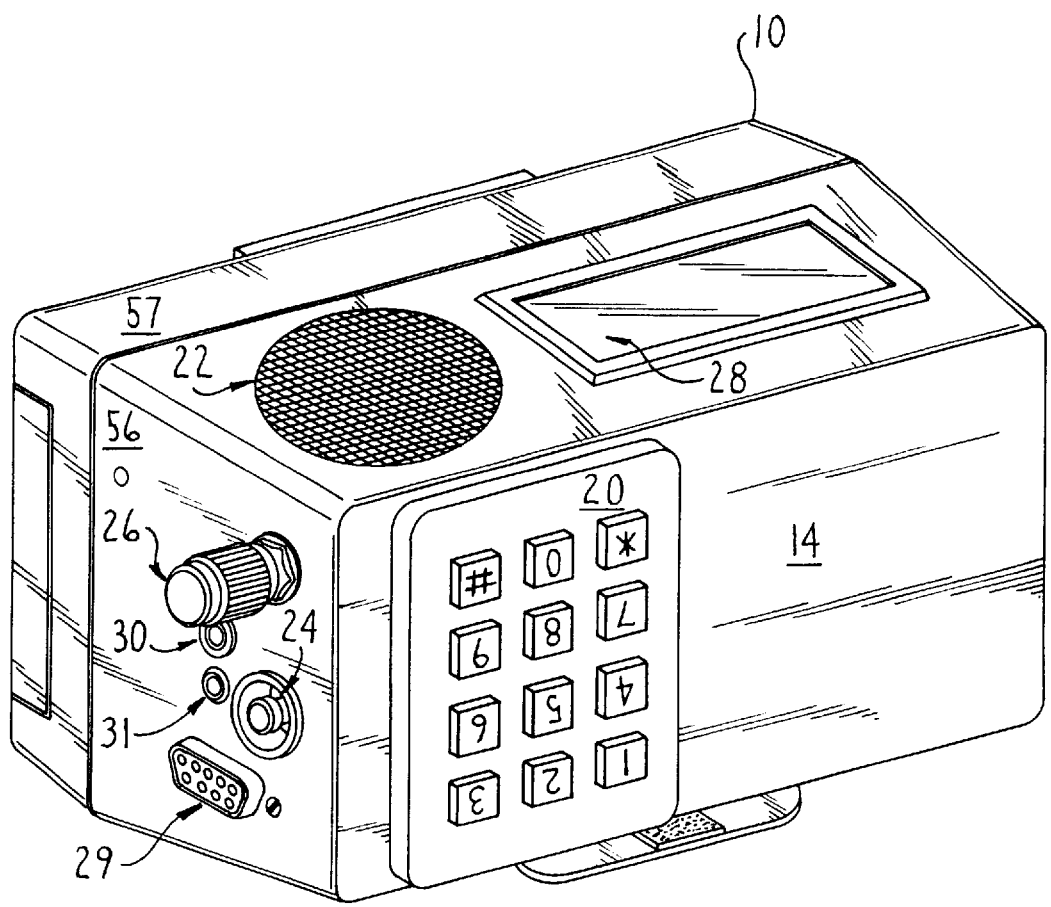
FIG. 2 is a perspective view of the learning and assessment aid.

As seen best in FIG. 2, secured to the outside of the housing 14 is keypad 20 through which the individual enters commands indicating the type of ambulatory movement he/she would like the aid to be monitoring. The learning and assessment aid 10 has a speaker 22 through which both audible instructions to the individual as well as information regarding how well he/she performed a specific ambulatory task are generated. Also on the outside of the housing 14 is a start button 24 which, as will be discussed hereinafter, is depressed as part of the initial actuation of the learning and assessment aid. A volume control 26 is provided for allowing the individual to control the audio level of the instructions and messages generated by the speaker 22. Volume control 26 also controls the open-closed state of a main on/off switch. A display 28 is secured to the top of the housing 14. The display 28 is driven by the microprocessor 18 to generate visual indications of the instructions required to operate the learning and assessment aid 10 as well as visual messages regarding how well the individual performed the tasks. A RS-232 data socket 29 is mounted to the side of the housing. The socket 29 provides a port that allows an external digital data processing device, such as a personnel computer to exchange signals with the microprocessor 18.

The depicted learning and assessment aid 10 is also provided with a socket 30 for receiving a jack integral with an earphone. A socket 31 is also provided for shorting out a set of conductors connected to the microprocessor 18, (conductors not illustrated). When reprogramming of the microprocessor 18 is desired, a pin is inserted in socket 31 to establish a connection between the conductors. The shorting out of the conductors is recognized by microprocessor 18 that it has been placed in a state for reprogramming.

Figure 3:
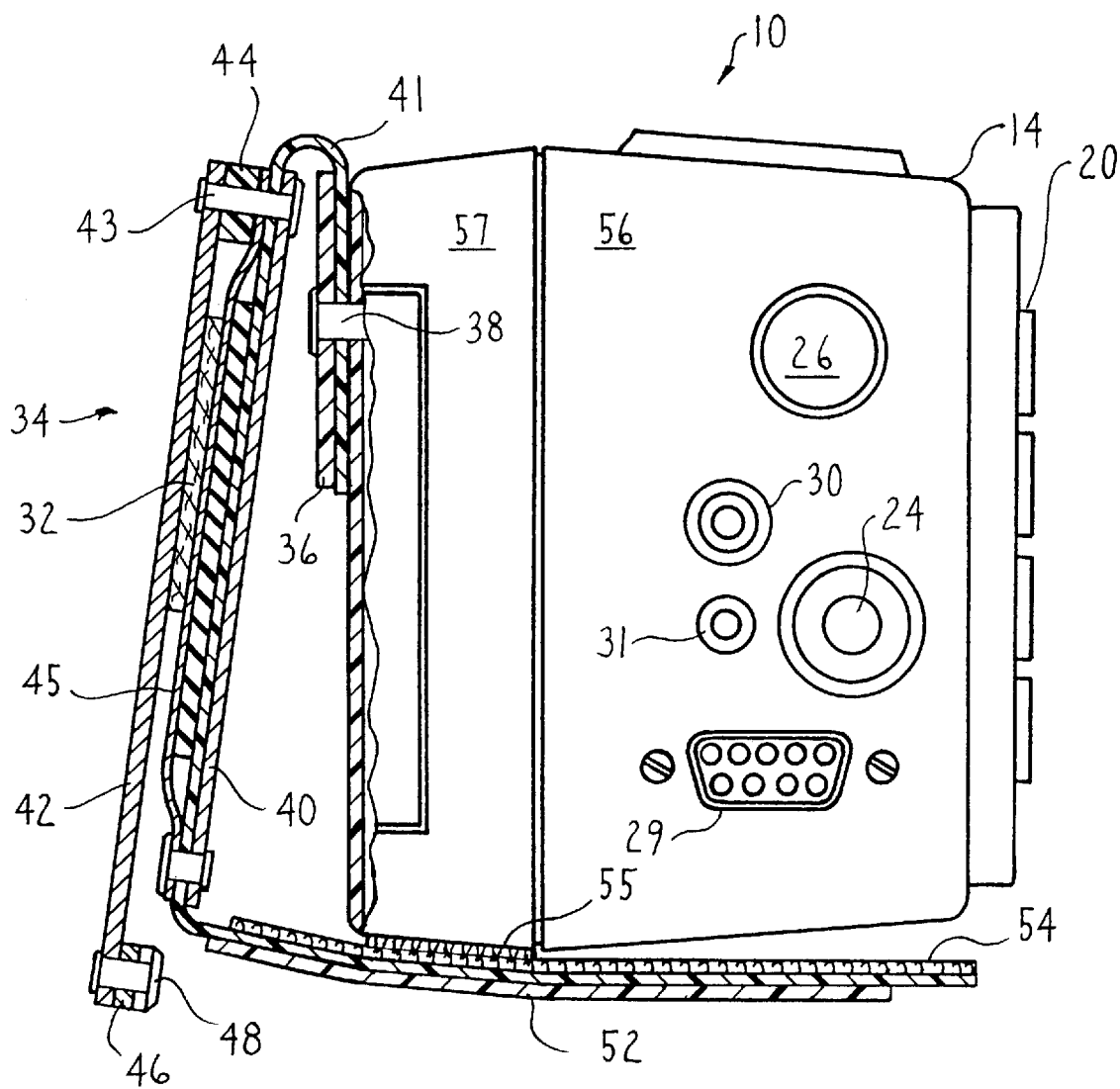
FIG. 3 is a cross sectional side view of the leveling clasp of the learning and assessment aid.

The learning and assessment aid 10 is typically coupled to a belt 32 worn by the individual 12 using the aid, as seen by reference to FIGS. 1 and 3. This belt 32 can be either a belt specifically provided for the learning and assessment aid or a belt that the individual 12 would normally otherwise be wearing as an article of clothing. The learning and assessment aid 10 is attached to the belt by a leveling clasp 34 that is secured to the back side of the housing 14. The leveling clasp 34 includes a back plate 36 that is the portion of the clasp 34 that is actually secured to the back side of the housing 14 with the aid of appropriate fasteners 38. A rigid outer clasp plate 40 is flexibly secured at the top end thereof to the back plate 36 by a strip of flexible material 41 such as a reinforced fabric or a flexible plastic strip. A rigid inner clasp plate 42 is attached to the top of the inner clasp plate 40 so as to be approximately in parallel alignment with the outer clasp plate 40 and so as to project a small distance below the bottom edge of the inner clasp plate. The inner clasp plate 42 is secured to the outer clasp plate 40 by a set of fasteners 43 and washers 44 so that the clasp plates 40 and 42 are spaced a slight distance apart from each other. When the learning and assessment aid 10 is worn by the individual 12, the clasp plates 40 and 42 are fitted around the belt 32. To facilitate a snug fit, a leaf spring 45 is attached to the surface of the outer clasp plate 40 that faces the belt 32. A layer of foam 47 is sandwiched between outer clasp plate 40 and leaf spring 45 to provide resiliency to the leaf spring. A small rigid pin formed by a disk of metal 46 and a set of fasteners 48 is provided along the bottom edge of the inner clasp plate 42. This pin is directed outwardly from the inner clasp plate 42. The pin is provided to minimize the possibility the leveling clasp 34 will inadvertently slip off the complementary belt 32 over which the clasp is fitted.

The leveling clasp 34 further includes a leveling plate 52 that is hingedly secured to the bottom edge of the inner clasp plate 40. In the depicted version of the invention, the strip of material forming flexible material 41 extends the length of outer clasp plate 40 and connects leveling plate 52 to the inner clasp plate. The leveling plate 52 is secured to the bottom surface of the housing 14 so as to hold the housing in a particular, substantially level, orientation. In the depicted version of the invention, the leveling plate 52 and the bottom surface of the housing are provided with complementary strips of fastening tape, 54 and 55, respectively, so as to facilitate the proper orientation of the housing. Fastening tape 54 and 55 allow leveling plate 52 to be selectively positioned relative to the bottom of housing 14. One such type of fastening tape that can be used to accomplish this task is sold under the trademark VELCRO.

Housing 14 is provided with a cord 15 that can be fitted around the neck of the individual 12 using the aid. Cord 15 prevents the learning and assessment aid 10 from inadvertently being dropped.

Figure 4:
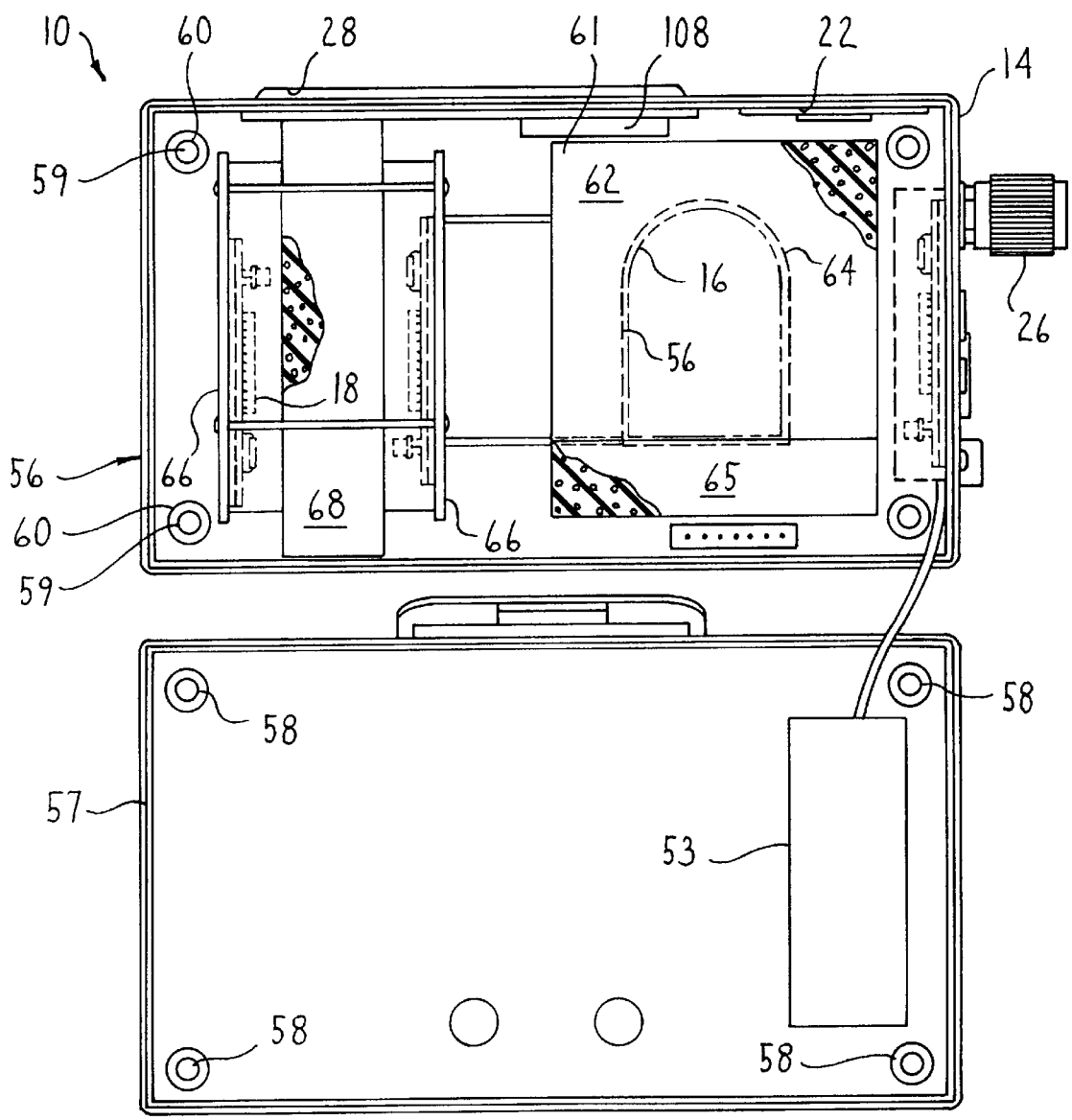
FIG. 4 is a view illustrating the arrangement of the components inside the learning and assessment aid.

The housing 14, as seen in FIGS. 2 and 4 includes a main body 56 with sufficient depth to hold the gyroscope 16, the microprocessor 18 as well as most of the other components of the learning and assessment aid. The main body 56 has an open back end that is enclosed by a cover 57. The cover 57 is the portion of the housing 14 to which the leveling clasp 34 is attached. The cover 57 is formed with a compartment 53 in which the battery 72 (FIG. 5A) that powers the learning and assessment aid 10 is housed. Threaded fasteners, not illustrated, secure the cover 57 to the main body 56 of the housing 14. The threaded fasteners extend through holes 58 in the cover 57 and are coupled into threaded bores 59 formed in posts 60 integral with the main body of the housing 14.

Gyroscope 16, now discussed with reference to FIG. 4, is a two axis gyroscopic. One particular gyroscope from which this invention can be constructed is the Model GE9300C gyroscope manufactured by Gyration, Inc. of Saratoga, Calif. This gyroscope has an outer gimbal and complementary encoders that are used for measuring heading over a 360° range. The inner gimbal is pendulous, that is, it stabilizes so as to be gravity aligned. Thus, any small deviations in tilting movement of the learning and assessment aid are compensated for by the inner gimbal.

As can be seen in FIG. 4, the gyroscope 16 is itself housed in a foam shell 61. More particularly, the foam shell 61 includes a box-like main body 62 that is shaped to have a center void 64 in which the gyroscope 16 is nested. A separate rectangularly shaped piece of foam is fitted under the main body 62 so as to serve as the base 65 of the shell. In practice it has been found desirable to dimension the overall height of the foam shell 61 so that it is longer in height than the space inside the housing 14 in which it is seated. Thus, when the gyroscope 16 and shell 61 are seated in the housing, the subassembly is compression secured inside the housing.

Two circuit boards 66 are mounted in the housing 14 so as to be located to one side of the gyroscope 16. The circuit boards 66, which in the depicted version of the invention are vertically oriented, support the microprocessor 18 as well as many of the other electrical components integral to the learning and assessment aid 10. In the depicted version of the invention, the electric components are mounted on the circuit boards 66 so that the components face each other. A foam layer 68 is compression fitted between the electrical components so as to secure socketed components in the circuit board.

The electrical components not secured to the circuit boards 66 are attached to the main body 56 of the housing 14. The display 28, is, for example, mounted in an opening, not identified, in the top of the main body 56. The display driver 108, the component that actuates the individual pixels of the display 28, is integrally manufactured with the display and as such, is suspended from the inside of main body 56. Speaker 22 is likewise secured to the inside of the top wall of the main body 56 of the housing 14.

Figure 5:
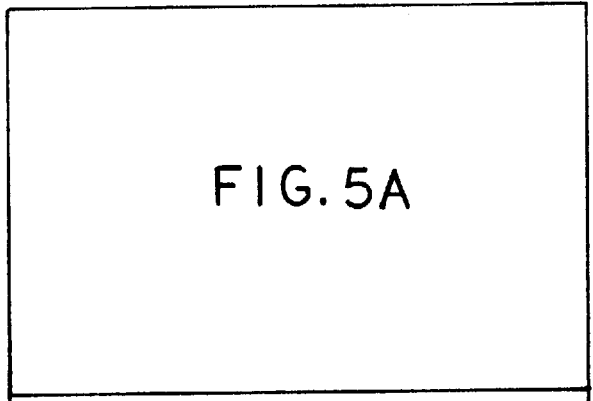
FIG. 5 is an assembly drawing illustrating how
Figure 5:
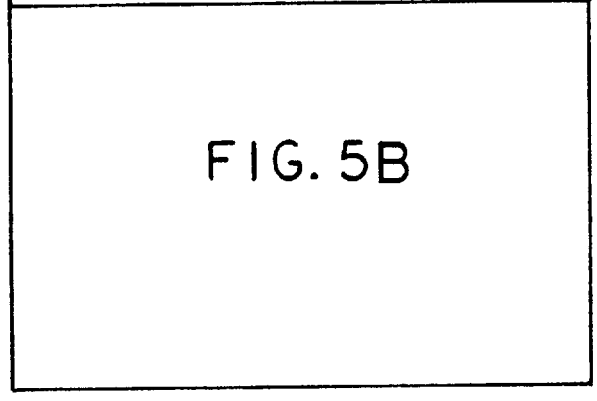
Figure 5A:
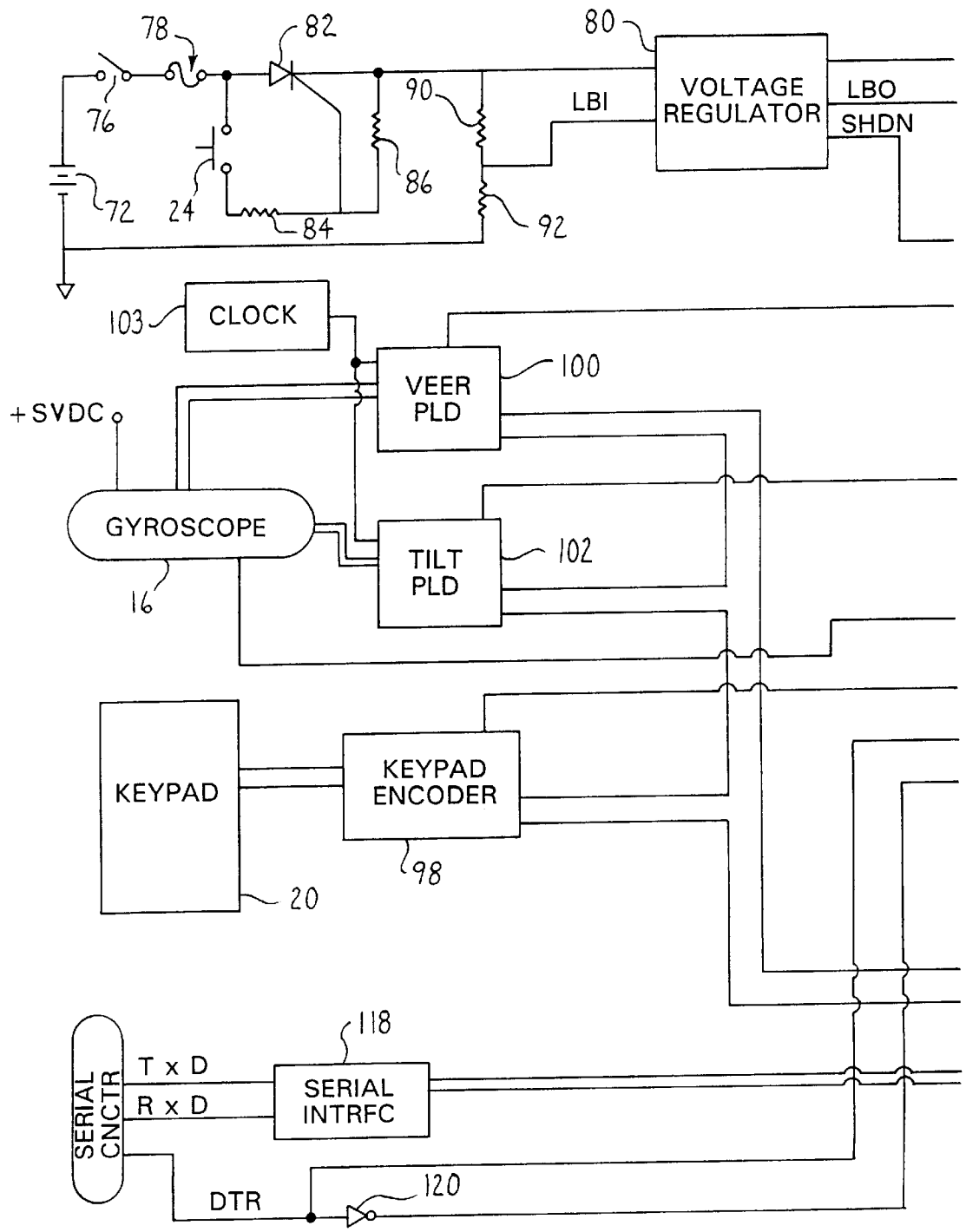
FIGS. 5A and 5B are assembled to form a schematic drawing of the electrical circuit integral with the learning and assessment aid.
Figure 5B:
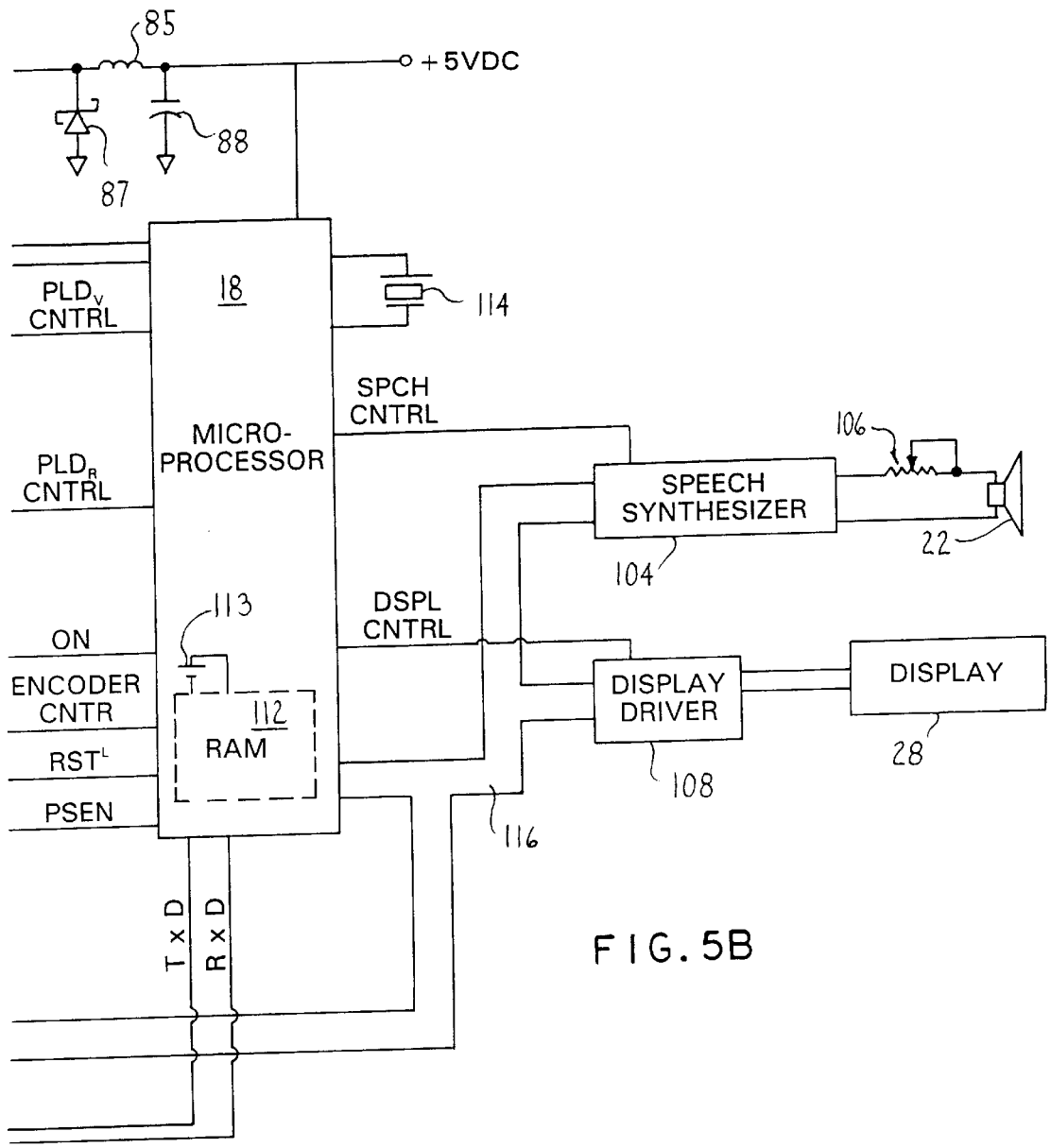

FIGS. 5A and 5B, when assembled, form a schematic diagram of the primary circuit components integral to the learning and assessment aid 10 of this invention. As seen in these Figures, battery 72 provides the energy needed to operate the other components integral with the learning and assessment aid 10. The positive terminal of battery 72 is tied to one end of a SPST switch 76 that functions as the main power on switch for the learning and assessment aid. Switch 76 is the main on/off switch integral with the volume control 26. A ⅜ Amp fuse 78 is attached to the opposed end of switch 76 to prevent excessively high currents from being applied to the other components of the learning and assessment aid 10.

The energy provided by the battery 72 is applied through fuse 78 to a voltage regulator 80. The voltage regulator 80 converts the battery voltage to a ±5 VDC level suitable for energizing the other components of the learning and assessment aid 10. One such suitable voltage regulator is the Maxim 639. In the depicted version of the invention, the battery voltage is applied from fuse 78 to voltage regulator 80 through an SCR 82. A bridge circuit consisting of normally open start button 24, a resistor 84 and a resistor 86 are tied from the anode of the SCR 82 to its cathode. The gate of the SCR 82 is tied to the junction of resistors 84 and 86. When switch 76 is closed to enable activation of the learning and assessment aid 10, SCR 82 is not in the on state. Therefore, there is no current flow through the SCR 82. In order to turn on the SCR 82 it is necessary to press, momentarily close, start button 24. This action causes a voltage to appear at the gate of the SCR 82 so as to turn on the SCR. Current will then flow through the SCR 82 to the voltage regulator 80 until the current demand of the voltage regulator ceases, as will be discussed hereinafter.

The output voltage produced by the voltage regulator 80 is made available to the other components of the learning and assessment aid through an inductor 84. A Shottky diode 86 is connected between the output terminal of the voltage regulator 80 and ground as is required for proper operation of the voltage regulator. A capacitor 88 is tied between the end of the inductor 84 distal from the voltage regulator 80 and ground. Collectively, inductor 84 and capacitor 88 filter the output energization signal produced by voltage regulator 80 to minimize voltage variations in the supplied power. To minimize the complexity of FIGS. 5A and 5B, only the +5 VDC power terminals of the gyroscope 16 and microprocessor 18 are illustrated. The power connections to the other components to which the energization voltage produced by the voltage regulator 80 is applied are not illustrated.

In the illustrated version of the invention, series connected resistors 90 and 92 are provided to form a voltage divider between the cathode of SCR 82 and ground. The voltage present at the junction of resistors 90 and 92 is applied to an input terminal of voltage regulator 80 as a LOW BATTERY INPUT (LBI) signal. In the event the LOW BATTERY INPUT signal falls below a specific level, voltage regulator 80 asserts a LOW BATTERY OUTPUT (LBO) signal to microprocessor 18. When microprocessor 18 receives the LOW BATTERY OUTPUT signal, it generates appropriate audible warnings over speaker 22 and on display 28 to inform the individual using the device of the state of the battery 72.

Voltage regulator 80 receives from microprocessor 18 a SHUTDOWN (SHDN) signal. As long as the SHUTDOWN signal, which is asserted low, is not received, voltage regulator 80 continues to produce an energization voltage for the other electrical components. Normally microprocessor 18 does not assert the SHUTDOWN signal. If, however, one of the buttons on the learning and assessment aid keypad 20 is not depressed after a given period of time, microprocessor 18 asserts the SHUTDOWN signal. Voltage regulator 80, upon receipt of the SHUTDOWN signal, ceases to produce the energization voltage and stops drawing current through SCR 82. The cessation of current flow through the SCR 82 turns off the SCR so as to stop current flow from the battery 72. Thus, the assertion of the SHUTDOWN signal turns off the learning and assessment aid to prevent needless current drain of the battery 72. If the learning and assessment aid 10 is to again be used, all that is necessary to reactive it is to depress start button 24 so as to again turn on the SCR 82.

Keypad 20 is a conventional 12-button telephone ("0", "1", . . . "9", "*" and "#") keypad. The open/closed states of the buttons of keypad 20 are monitored by a keypad encoder 98 such as a 74C922. Depending on which of the buttons are depressed, keypad encoder 98 selectively asserts a parallel, 4-bit signal to microprocessor 18.

Gyroscope 16 produces two sets of pulsed quadrature output signals. A first set of signals are representative of the veer of the learning and assessment aid 10, the extent to which the learning and assessment aid is rotated to either the left or the right in a horizontal plane. The second set of signals are representative of the tilt of the learning and assessment aid 10, the extent to which the learning and assessment aid pitches or rolls outside of a horizontal axis. Each set of quadrature output signals is applied to a separate programmable logic device (PLD) that initially processes the signals. The veer quadrature signals are applied to PLD 100. The tilt quadrature signals are applied to PLD 102. Altera EP600 programmable logic chips can be employed as PLDs 100 and 102.

Each PLD 100 and 102 processes the quadrature signals received thereby to produce an output signal representative of the incremental rotation of the learning and assessment aid 10. In an initial processing step, each PLD 100 or 102 removes the jitter from the received quadrature signals. This jitter occurs because the rotating disk internal to the gyroscope produces minute vibrations that interfere with the make/break optical apparatus which produces the quadrature signals. These vibrations introduce a small bounce, a jitter, into the high/low transitions of the quadrature signals. The PLDs 100 and 102 are configured to initially remove this jitter from the signals they receive.

Once the PLD 100 or 102 removes this jitter, the PLD performs its second processing step of generating a count representative of the incremental rotation of the learning and assessment aid 10. In the described version of the invention, the quadrature signals generated by the gyroscope 16 provide a resolution to 0.2° of the rotation of the learning and assessment aid. Each PLD 100 and 102 contains a register in which an up/down count of the rotation of the learning and assessment aid is maintained as represented by the state of the received quadrature signals. The count maintained by PLD 100 is representative of the incremental right/left veer of the learning and assessment aid. The count maintained by PLD 102 is representative of the up/down pitch, the tilt, of the learning and assessment aid 10. As will be described hereinafter, these counts are periodically supplied to microprocessor 18.

A dedicated clock 103 is provided for the PLDs 100 and 102. Clock 103 generates a dedicated clock pulse signal to the PLDs 100 and 102 that facilitate their jitter removal and up/down count processing functions. In some preferred versions of the invention, clock 103 produces a 50 KHz signal with a 50% high cycle pulse.

The speaker 22 is supplied with audio signals from a speech generator 104. In one version of the invention, two ISD2560 speech storage chips are assembled together to form the speech generator 104. These speech storage chips contains a set of recorded words, numbers and sounds that, when selectively retrieved, are applied to the speaker 22 so that they are reproduced as audible instructions and information. A potentiometer 106 connected between the speech generator 104 and the speaker 22 controls the volume of the produced speech. Potentiometer 106 is the component of the learning and assessment aid that is controlled by the actuation of volume control 26.

Display 28 produces visual representations of the instructions and other information generated by speaker 22. In one version of the invention display 28 is a MDL16265 display manufactured by Varitronixs. This particular display 28 is an LCD display that produces two 16 character lines of alphanumeric characters. Integral with display 28 is a display driver 108 that controls which of the individual LCD pixels are actuated in order to cause a given character set to appear.

Microprocessor 18 can be a general control microprocessor unit. One suitable microprocessor 18 is the DS5000 microprocessor manufactured by Dallas Semiconductor. This particular microprocessor 18 has an internal RAM 112 in which the operating instructions for the microprocessor are stored. Also internal to microprocessor 18 is a battery 113 that provides the voltage required to energize the RAM 112. Thus, the RAM 112 remains energized, and the instructions held therein remain stable, even when the battery 72 is switched off. Microprocessor 18 is provided with clock pulses from a crystal 114. In one preferred version of the invention, crystal 114 provides clock pulses having a frequency of 11.059 MHz at a 50% high duty cycle.

Data and instructions are primarily exchanged between microprocessor 18 and the other circuit components over an 8-bit parallel signal main data bus 116. More particularly, the 4-bit words representative of the buttons depressed are forwarded from keypad encoder 98 to microprocessor 18 over the main data bus 116. The data produced by the PLDs 100 and 102 representative of the incremental rotation and tilt of the learning and assessment aid 10 are likewise forwarded to the microprocessor 18 over the main data bus 116. Microprocessor 18 transmits instructions regarding messages to be aurally and visual reproduced to, respectively, the speech generator and the display driver 108 over the main data bus 116.

In addition to the main data bus 116, there are a number of other connections between microprocessor 18 and the other electrical components of the learning and assessment aid 10. While there are typical multiple serial connections to each component, to reduce the complexity of FIGS. 5A and 5B, only a single serial connection to each component is shown. For example, in a set of KEYPAD CONTROL (KYPD CNTRL) signals, keypad encoder 98 informs microprocessor 18 when the keypad encoder has data representative of a depressed button to transmit and the microprocessor informs the keypad encoder when the data can be transmitted over the main data bus 116. Sets of $PLD_V$ CONTROL ($PLD_V$ CNTRL) and $PLD_T$ CONTROL ($PLD_T$ CNTRL) signals are exchanged between microprocessor 18 and, respectively PLD 100 and PLD 102. In the PLD CONTROL signals, microprocessor 18 instructs the PLDs 100 and 102 when to transmit the incremental rotation data over the main data bus 116 and when to clear their data registers that hold this data.

There are SPEECH CONTROL (SPCH CNTRL) signals that are exchanged with the speech generator 104 and DISPLAY CONTROL (DSPLY CNTRL) signals that are exchanged with the display driver 108. In the SPEECH CONTROL signals, microprocessor 18 informs the speech generator 104 when a data word is being transmitted to the speech generator 104. Also as part of the SPEECH CONTROL signals, the speech generator 104 informs the microprocessor 18 when a particular segment of speech is being generated; this facilitates the proper timing of speech generation commands from the microprocessor 18. In the DISPLAY CONTROL signals, the microprocessor 18 informs the display driver 108 when data words are being transmitted over the main data bus 116 for application to the display driver.

Microprocessor 18 also selectively asserts an ON signal to gyroscope 16 to control the on/off state of the gyroscope. Only when the gyroscope 16 is in the on state does the gyroscope draw current from battery 72.

FIGS. 5A and 5B also illustrate the serial connector, the RS-232 data socket 29, through which the learning and assessment aid 10 may be coupled to an external computer. This connection facilitates the downloading of stored data in the microprocessor 18 to the external computer or the reprogramming of the microprocessor by instructions transmitted from the external computer. Data are transmitted from the microprocessor 18 over a dedicated TxD conductor; data and instructions are loaded into the microprocessor over a dedicated RxD line. In order to facilitate this data link, a serial interface 118 is connected to the TxD and RxD lines. One suitable serial interface is the DS1275 manufactured by Dallas Semiconductors. A data transmit (DTR) line also extends from the data socket 29 to the microprocessor 18. A signal is asserted over this line whenever the external computer is being used to reprogram the microprocessor 18. In the illustrated version of this invention, the true version of this signal is applied as a RESET (RST) signal to the microprocessor 18 while an inverted version is applied to the microprocessor as a PROGRAM STORE ENABLE (PSEN) signal. This latter, inverted, signal is produced by an invertor 120 connected to receive the DTR signal.

It should be realized that the foregoing description is directed to the primary components of the circuitry internal to the learning and assessment aid 10 of this invention. To minimize drawing complexity, certain other components have not been illustrated or described. For example, not illustrated is the connection to the earpiece socket 30 or the speaker cut out-switch that is closed when a jack is inserted in socket 30. The conductors that extend from microprocessor 18 to the program pin socket 31 are likewise not shown. Also, while not illustrated, it should be understood that in some preferred versions of the inventions, pull-up resistors may be tied between the +5 VDC voltage source and the individual conductors forming the main data bus 116. Similarly not shown are voltage and current protection resistors and diodes as well as the filtering capacitors.

Figure 6:
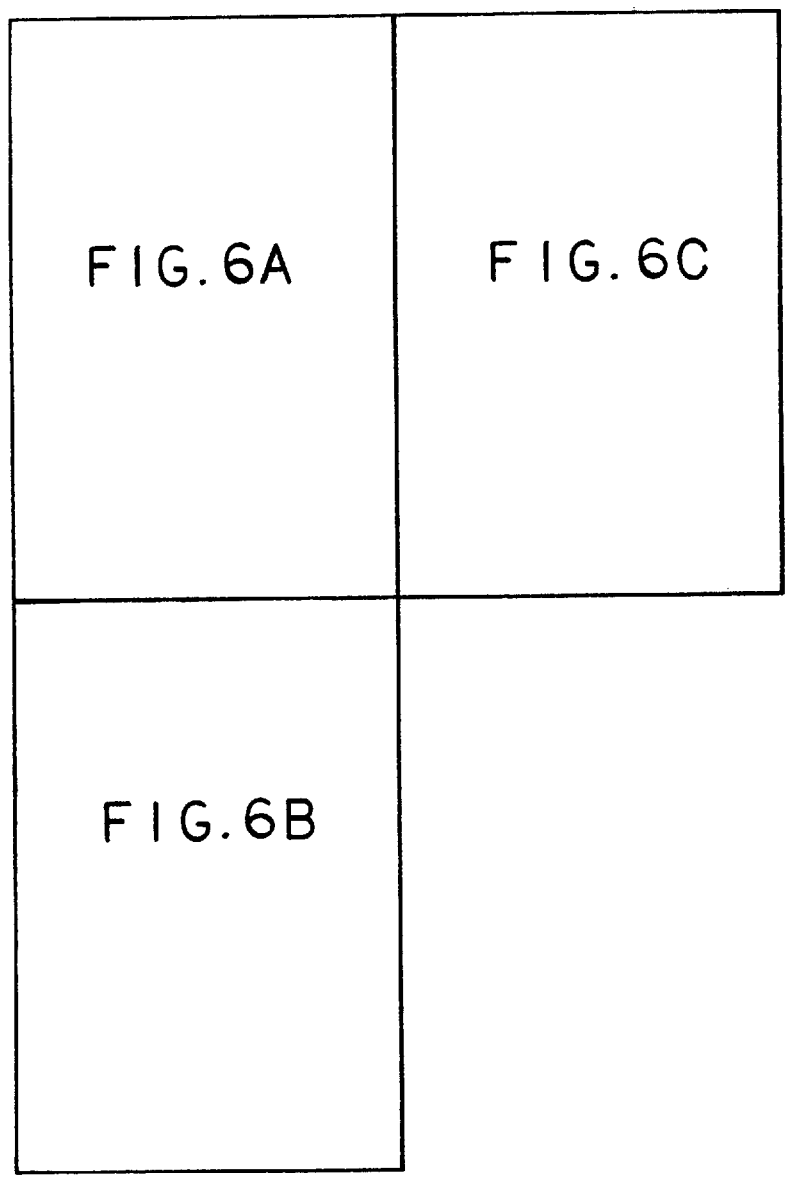
FIG. 6 is an assembly drawing illustrating how
Figure 6A:
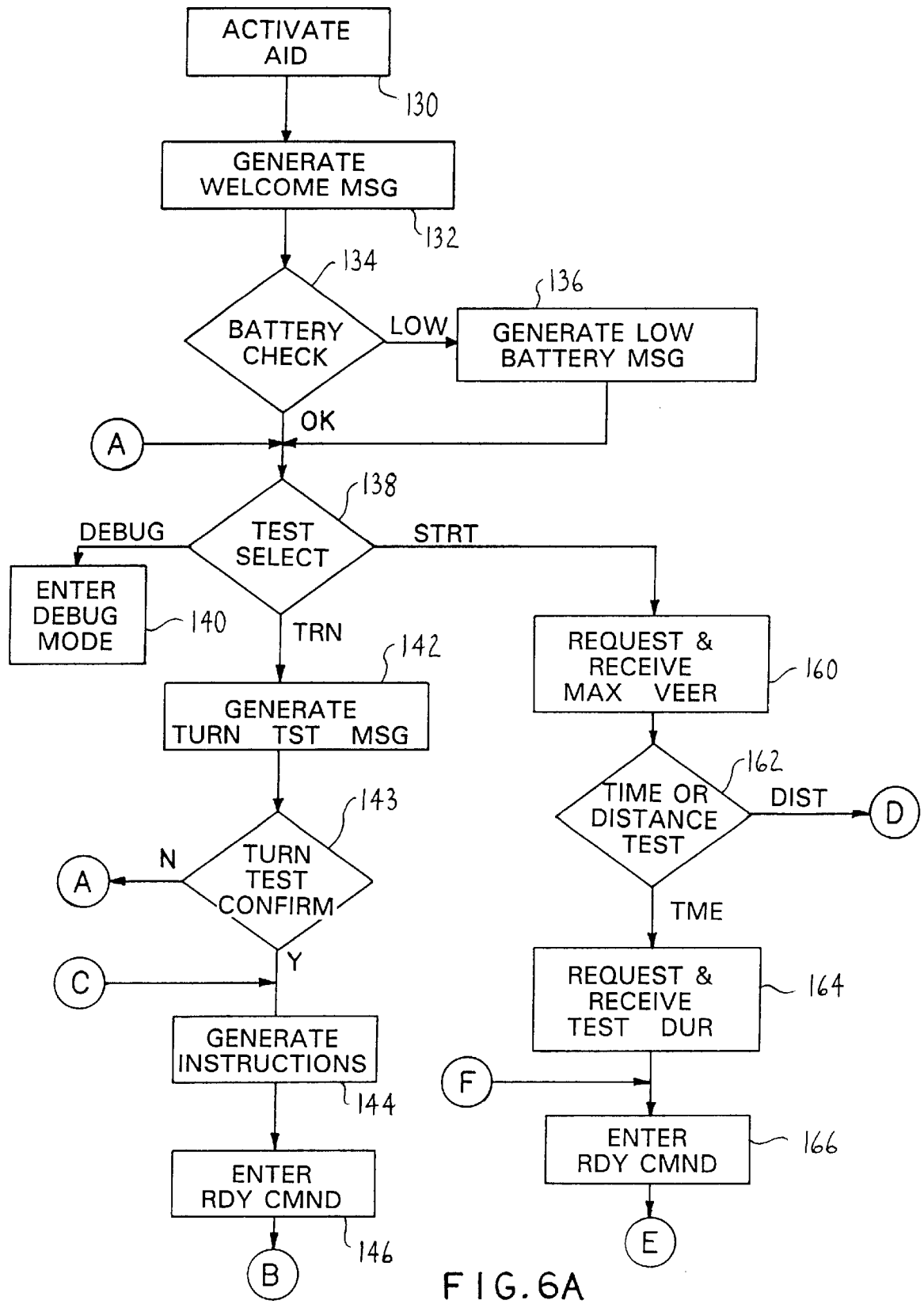
FIGS. 6A, 6B and 6C are assembled to form a flow chart of the process steps executed by the learning and assessment aid when it is used to foster desirable locomotion habits.
Figure 6B:
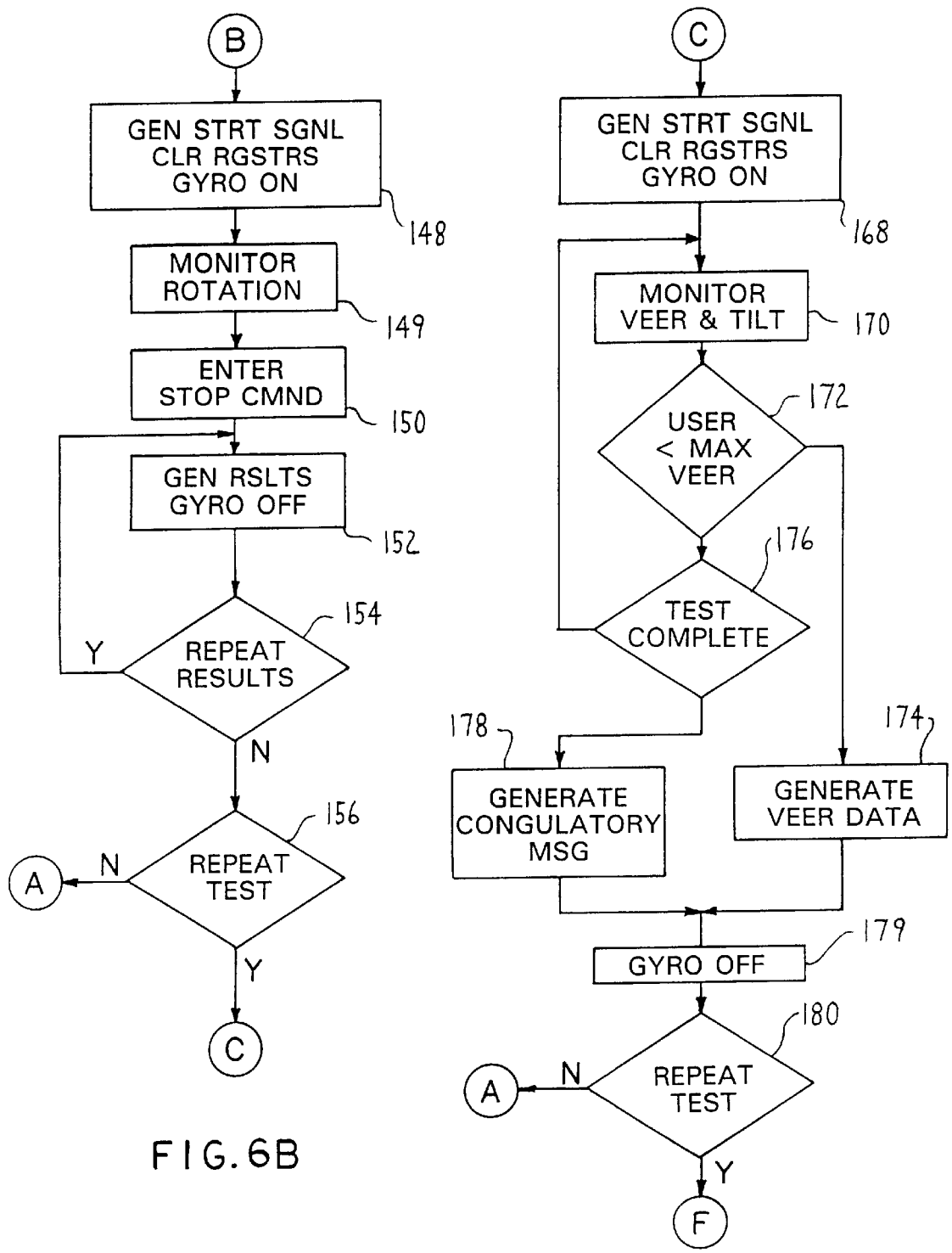
Figure 6C:
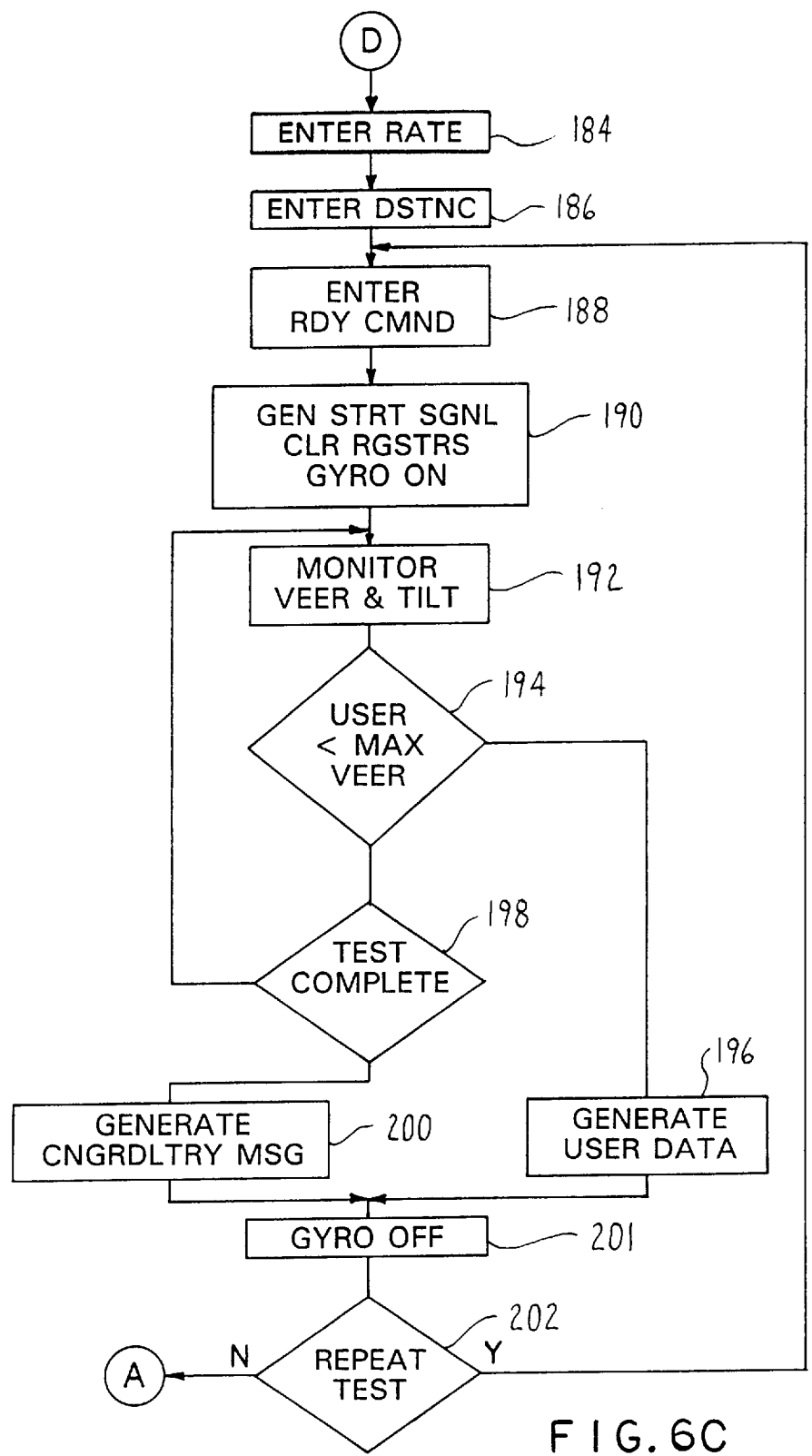

FIGS. 6A, 6B and 6C, when assembled together, depict the process steps executed by the learning and assessment aid 10 of this invention when used as a guide to help foster desired locomotion habits in a visually impaired individual 12. As represented by actuation step 130, the learning and assessment aid is initially turned on by rotating volume control 26 to close switch 76 and momentarily depressing, closing, start button 24. Once the learning and assessment aid 10 is turned on, a welcome message is generated as represented by step 132. In the generate welcome message step 132, as in each other step wherein the learning and assessment aid either provides information or requests instruction, microprocessor 18 generates the appropriate commands so that the information/instructions are both presented on the display 28 and produced aurally by speaker 22. Thus, both the visually impaired individual 12, as well as any sighted instructor, will have ready access to the information/ instruction.

Once generate welcome step 132 is executed, microprocessor 18 performs battery check step 134. In battery check step 134, the microprocessor 18 determines whether or not voltage regulator 80 has asserted a LOW BATTERY OUTPUT signal as an indication that the battery voltage is falling below acceptable levels to energize the other components of the learning and assessment aid. If the LOW BATTERY OUTPUT signal is not asserted, microprocessor 18 proceeds to the next processing step. If the LOW BATTERY OUTPUT signal is received, microprocessor 18 causes a low battery voltage warning message to be generated, represented by step 136, before proceeding to the next processing step. It should be recognized that while in the flow chart of FIGS. 6A, 6B, 6C, battery check step 134 is depicted as occurring only once, the learning and assessment aid 10 is configured so that this step is executed repeatedly throughout the period of time that the learning and assessment aid is actuated.

After battery check step 134, learning and assessment aid 10 executes a test select step 138. In test select step 134, microprocessor 18 initially generates a message requesting the individual 12 to indicate if the learning and assessment aid 10 is to be used for turn testing or straight-line movement testing. In this part of step 138, microprocessor 18 generates a message asking the individual 12 to enter "1" for a straight-line test or "2" for a turn test. The individual 12 enters his/her selection by depressing the appropriate button on keypad 20.

While not depicted as an explicit step, a part of test select step 134, as well as every other step executed by the microprocessor 18 in which it waits for a user response is a time out exceeded step. In each time-out exceeded step, microprocessor 18 initiates an time-out elapsed time counter coincident with the generating of the request for an individual-entered command. If the time-out elapsed time exceeds a pre-set time out period, the situation is interpreted by the microprocessor 18 as an indication that use of the learning and assessment aid is no longer required. Accordingly, the microprocessor 18 asserts the SHUTDOWN signal to the voltage regulator to cause the deactivation of the learning and assessment aid 10 to conserve battery energy. In one version of the invention, microprocessor 18 is configured to wait 2 minutes after generating an instruction to receive a complementary command; if a command is not received, the SHUTDOWN signal is asserted. If use of the learning and assessment aid is again desired, all that is necessary is to depress start button 24 so as to reinitiate current flow through SCR 82.

If, however, in step 138, the individual 12 presses a keypad button before the end of the time out period, the learning and assessment aid 10 will enter either a mode for a turning test or a mode for a straight-line test. Also, the microprocessor 18 is further configured so that if a phantom command is entered by depressing a button or sequence of buttons, the learning and assessment aid 10 will enter a debug mode as represented by step 140. By "phantom command" it is understood that the particular set of buttons forming the command is not a set that is announced to the individual 12 in the initial part of step 138. It is a command only known to personnel charged with the maintenance of the learning and assessment aid 10. Once the learning and assessment aid 10 is in the debug mode maintenance can be performed on the aid and the hardware and software forming the aid. Still other phantom commands may be entered to place the learning and assessment aid 10 in a data collection mode which, as discussed hereinafter, is used to obtain data about the locomotion performance of the individual 12.

If the individual 12 indicates that the learning and assessment aid 10 is to be used for turn training, the learning and assessment aid 10 executes a generate turn test message, represented by step 142. In step 142, the learning and assessment aid generates a message stating that it has been placed in the turn test mode. The learning and assessment aid 10 then proceeds to execute a turn test confirm step 143. In step 143, the learning and assessment aid 10 instructs the individual 12 to depress particular keypad 20 buttons to indicate if the learning and assessment aid should be in the turn test mode or if the individual 12 made an incorrect selection. If the resultant user commands indicate that the individual entered the correct command, the learning and assessment aid executes the next step in the turn test mode sequence. If the individual 12 indicates that an incorrect command was issued, the learning and assessment aid reexecutes test select step 138 to give the individual 12 the opportunity to again place the learning and assessment aid 10 in the correct mode.

Steps 142 and 143 are executed in order to provide a visually impaired individual the opportunity to confirm that the correct instructions have been entered into the learning and assessment aid and to correct the instructions if they were incorrectly entered. Steps similar to steps 142 and 143 are executed each time after most commands are entered into the learning and assessment aid in order to provide similar opportunities for the individual 12 to confirm/correct the entered command. For the purposes of simplicity steps 142 and 143 are, however, the only confirm/correct steps explicitly illustrated and described.

If the individual 12 has confirmed the learning and assessment aid is to be used for turn testing, a generate instruction step 144 is executed. In step 144, instructions are generated that advise the individual 12 to press a specific button when ready to start the test, to start turning upon hearing a start command, and to press a specific button to indicate completion of the turn. Once the ready command is received from the individual 12 in a step 146, the learning and assessment aid proceeds to a step 148. In step 148, microprocessor 18 causes an audible start signal to be generated. In one version of the invention, this start signal is a distinct gunshot sound. Upon receiving a feedback signal from the speech generator 104 that the start signal is being generated, microprocessor 18 asserts the ON signal to the gyroscope 16. Prior to this time, the ON signal was negated in order to minimize the current drawn by the gyroscope 16. Microprocessor 18 also clears the registers internal to itself and the PLDs 100 and 102 in which the data regarding the cumulative rotation of the learning and assessment aid 10 is stored.

Once the start signal is generated, the microprocessor 18 begins monitoring the rotation of the learning and assessment aid 10 as represented by step 149. This is accomplished by periodically receiving from PLD 100 the data words that contain the incremental rotational information about the extent to which the other components of the learning and assessment aid 10 rotate around the gyroscope 16. In one version of the invention, microprocessor 18 polls PLD 100 once every 35 milliseconds for this incremental rotation data. After this polling, microprocessor 18 then issues an instruction clearing the register internal to the PLD 100 that contains the incremental rotation data. Microprocessor 18 then adds/subtracts the incremental rotation data received from the PLD in an internal register. The value in this register thus is an unfiltered indication of the extent the learning and assessment aid 10 has rotated to the left or right since the initiation of the start command.

Microprocessor 18 continues to acquire data representative of the rotation of the learning and assessment aid until, in step 150, the individual 12 enters the stop command. Once the stop command is entered, the learning and assessment aid 10 performs a generate results step 152 in which a message is generated informing the individual 12 of the extent to the left or right he/she and the learning and assessment aid have turned from their initial position. Also in step 152 the ON signal to the gyroscope is negated to eliminate needless current drawn by the gyroscope. To facilitate the cognizant receipt of the result by a visually impaired individual, learning and assessment aid 10, in a repeat results step 154, asks if the individual 12 wants the results repeated. If the individual 12 answers affirmatively in step 154, the data generation portion of step 152 is reexecuted.

Once the individual 12 has indicated in step 154 that he/she does not want the results repeated, learning and assessment aid 10 proceeds to a repeat test step 156. In step 156, the individual 12 is asked if he/she would like to repeat the turn test. If the individual 12 enters an affirmative command in step 156, the learning and assessment aid returns to generate instructions step 144 to repeat the turn test. If, however, the individual 12 responds to the negative in step 156, the learning and assessment aid 10 returns to execute test select step 138.

If, in test select step 138, the individual 12 indicates that the learning and assessment aid 10 is be used as an aid to foster straight-line movement, the learning and assessment aid proceeds to execute a request and receive maximum veer step 160. In step 160, the learning and assessment aid has the individual 12 enter the maximum veer that will be allowed to occur during the test. After the individual 12 enters the maximum veer, in a step 162, the individual 12 is asked to enter a command indicating the test is to be used to monitor his/her straight-line motion over a period of time or for a given distance.

If the individual 12 wants the straight-line test to be for a period of time, the learning and assessment aid, in step 164 asks the individual 12 to enter an indication of the duration of time, in seconds, the individual's movement is to be monitored. In step 166 the individual 12 is then asked to enter a ready command to indicate he/she is ready to start the test. In step 166, as in the other steps in which the individual 12 is required to indicate his/her ready state, the individual 12 enters the ready command by depressing the "#" button on keypad 20. Once the ready command is entered, in step 168 microprocessor 16 causes the audible start signal to be generated, activates the gyroscope 18 and clears both its internal rotation and tilt registers as well as the incremental rotation and tilt registers in PLDs 100 and 102, respectively.

The learning and assessment aid then proceeds to monitor veer and tilt step 170. In step 170 veer is monitored by periodically retrieving the incremental rotation data from PLD 100. This incremental rotational data is summed and held in a raw veer register internal to the microprocessor. The raw veer data is then filtered to create a filtered veer value. This filtering serves to remove the rhythmic, small amplitude, step-by-step rotation of the trunk of the individual 12 that normally occurs during walking. One particular algorithm for providing a filtered veer value is:

$$FV=(IV/FF)+PFV-(PFV/FF)$$

Where:

FV Is the filtered veer value

IV Is the current raw veer value, the unfiltered cumulative rotation of the learning and assessment aid about the vertical axis of the gyroscope.

FF Is an integer greater than zero, typically a value between 1 and 16.

PFV Is the immediate past filtered veer value

The filtered veer value is the value upon which the subsequent comparisons are made as well as the veer value reported to the individual 12 and that is presented on the display 28.

In step 170 microprocessor 18 also receives from PLD 102 the data representative of the incremental tilt of the learning and assessment aid 10 around the gyroscope 16. These incremental tilt values are added together and are held in unfiltered form in a resultant register and are presented on the display 28.

In step 172 the microprocessor 18 compares the filtered veer value to the maximum veer value previously entered by the individual 12. If the filtered veer value is greater than the maximum veer value, microprocessor 18 proceeds to execute a step 174 in which an announcement is generated informing the individual 12 that the maximum veer was exceeded and the time into the test at which it was exceeded.

If the filtered veer did not exceed the maximum veer, microprocessor 18 instead proceeds to execute test complete step 176. In test complete step 176, microprocessor 18 compares the elapsed time of this test to the previously entered test duration. If this comparison indicates that the test has not been for the complete user-selected period, microprocessor 18 reexecutes monitor veer and tilt step 170. If, however, the total time of the test is equal to or greater than the user-entered test duration, microprocessor executes generate congratulatory message step 178. In step 178, microprocessor 18 causes a short congratulatory message to be played through the speaker 22 and to be presented on display 28.

Once either step 174 or 178 is executed, the gyroscope is deactivated in a step 179. A repeat test step 180 is then performed. In step 180 the individual 12 is prompted to enter an instruction indicating if he/she wants the same test repeated or would like the learning and assessment aid to be used to perform a new test. Depending on what instruction is entered, microprocessor 18 then proceeds to either execute test select step 134 or enter ready command step 166.

If, in time or distance test step 162, the individual 12 indicates that a distance test is to be executed, microprocessor proceeds to an enter rate step 184. In step 184 the individual 12 is requested to enter the time, in seconds, it takes the individual 12 to walk a set distance, for example, 60 feet. This data is obtained prior to the use of the learning and assessment aid 10. Microprocessor 18 then proceeds to execute an enter distance step 186 in which it asks the individual 12 to enter a command indicating the distance over which his/her movement is to be monitored.

An enter ready command step 188 is then executed by the individual 12. Microprocessor 18 then proceeds to cause the generation of a start signal, actuate the gyroscope 16 and clear the cumulative rotation and tilt registers in a step 190. Step 190 is similar in form and function to previously described step 168.

Once the start signal is generated, the learning and assessment aid 10 proceeds to a monitor veer and tilt step 192. In step 192 the same veer monitoring, veer filtering and tilting monitoring is performed as is performed in step 170. Also in step 192, the microprocessor 18 determines the distance the individual 12 has walked. This determination is made by multiplying the elapsed time since the start of the test by the individual's rate of travel. Once microprocessor 18 has determined the current filtered veer value, a step 194 is executed in which the filtered veer is compared to the user-entered maximum veer. If the filtered veer has exceeded the maximum veer, a step 196 is executed in which the individual 12 is informed that he/she exceeded the preset maximum veer and the distance walked before the maximum veer was exceeded.

If the individual 12 does not exceed the maximum veer, microprocessor 18 executes a test complete step 198. In step 198, the calculated distance walked is compared to the user-set test distance. If the individual 12 has walked less than the set distance, microprocessor returns to the monitor veer and tilt step 192. Once the individual 12 has walked the set distance, a generate congratulatory message step 200 is executed. Step 200 is similar to previously described generate congratulatory message step 178.

After either step 196 or step 200 is executed the gyroscope 16 is turned off in a step 201. A repeat test step 202 is executed inquiring if the individual 12 wants to perform the same test. Depending on the command the individual 12 enters in response to this query, the learning and assessment aid 10 either returns to the initial test select step 134 or to the enter ready command step 188.

Figure 7:
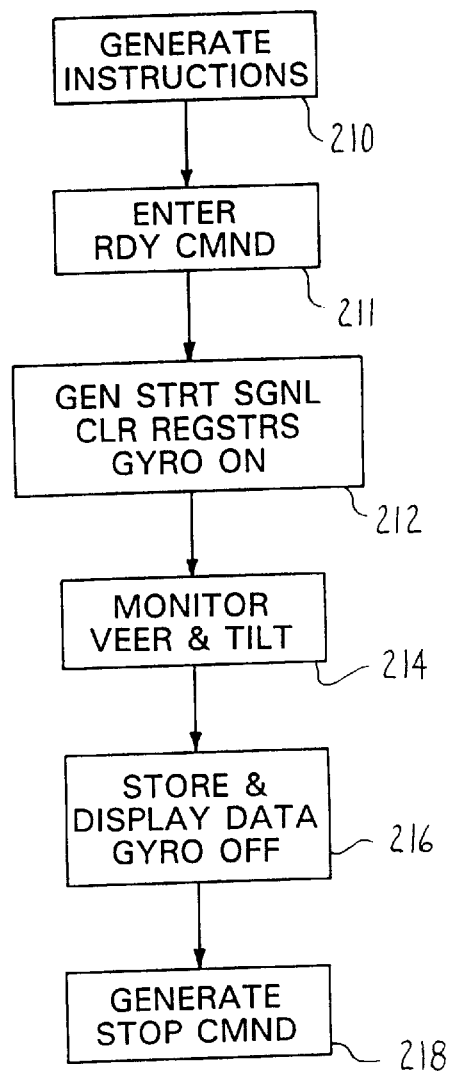
FIG. 7 is a flow chart of the process steps executed by the learning and assessment aid of this invention when it is used to collect data about the locomotion habits.

FIG. 7 illustrates the process steps executed by the learning and assessment aid 10 of this invention when the aid is placed in the data collection mode. As discussed above, the learning and assessment aid 10 is placed into the data collection mode by the entry of a phantom command during the test select step 138 (FIG. 6A). Once the learning and assessment aid 10 is placed in the data collection mode, the aid executes a step 210 in which it generates an instruction directing the individual to enter a command indicating that he/she is ready for the assessment to proceed. Once the ready command is entered step 211, microprocessor 18 executes a step 212 similar to step 168 in which an audible start command is generated, the registers are cleared and the gyroscope 16 is actuated.

Once step 212 is executed, the individual then attempts to walk in a straight-line path. During this time period the learning and assessment aid 10 performs a monitor veer and tilt step 214 similar to step 170. Once a preprogrammed time period, typically between 10 and 60 seconds, has elapsed, the learning and assessment aid 10 executes a data lock step 216. In the data lock step 216, the veer and tilt data collected by the learning aid are stored and presented on display 28. Gyroscope 16 is deactuated. Only after step 216 is executed does the learning and assessment aid 10 generate an audible stop command to the individual in a step 218.

The learning and assessment aid 10 of this invention is easily fitted to a belt 32 or another article of clothing worn by the individual 12. The leveling clasp 34 facilitates the proper ground-oriented alignment of the learning and assessment aid to ensure that the gyroscope 16 will be in the proper orientation to generate signals that accurately represent movement veer and pitch. Moreover, the speaker 22 internal to the learning and assessment aid 10 generates the audible commands that facilitate its use by a visually impaired individual 12 without the assistance of a sighted individual. Collectively, these features of the learning and assessment aid 10 of this invention make it relatively easy to use the learning and assessment aid as an assessment and training tool for assisting individuals who are visually impaired in their development of skillful locomotion habits. Moreover, once the commands are entered into the learning and assessment aid 10, the individual using it does not have to hold or otherwise touch the aid. Consequently the individual is able to walk in his/her normal movement patterns; he/she is not offset by having to hold the learning and assessment aid in a particular position. Thus, the learning and assessment aid 10 can be used in conjunction with other aids such as cane or a dog guide.

Moreover, the learning and assessment aid 10 of this invention is not just useful as an aid for helping individuals who are the visually impaired walk in a straight-line. It can further be used to help train these individuals to execute turns with some degree of accuracy. Also, by connecting the learning and assessment aid to a computer through data socket 29, an incremental, moment-by-moment analysis of the individual's ambulatory movement can be obtained and recorded. When, for example, this recording is performed for straight-line testing it includes an indication of: the time since the start of the test; the raw, cumulative, veer; the filtered veer; the raw, cumulative, pitch, the incremental change in direction; the incremental change in pitch; and the incremental change in compensation factor used to provide the filtered direction. All of this data can be printed out or displayed in order to enable persons working with the individual 12 using the learning and assessment aid 10 to analyze the individual's ambulatory movement patterns in order to help the individual develop desirable ambulatory motion patterns.

It should further be recognized that the aid 10 of this invention is useful not just as a training tool but as a device for assessing the basic locomotion habits of an individual. When the aid 10 is in the data collection mode, it does not audibly announce the sensed veer. It presents this information on the display 28 so that it is available for the instructor. Moreover, the aid 10 does not command the individual to stop walking until after the data collection period has ended and the data is stored. Thus, the individual using the aid in this mode does not receive any audible cues that could potentially influence his/her walking patterns and is less likely to alter his/her locomotion patterns in response to an anticipated stop command.

Moreover, the microprocessor 18 will deactivate the learning and assessment aid 10, if the individual does not enter a command before the expiration of the time out period. Also, the microprocessor 18 controls the on/off state of the gyroscope 16 to only hold the gyroscope on during the period in which the learning and assessment aid is actually being used to monitor movement. Collectively, these features minimize the power drawn by the battery 72 so as increase the useful lifetime of the battery.

Figure 8:
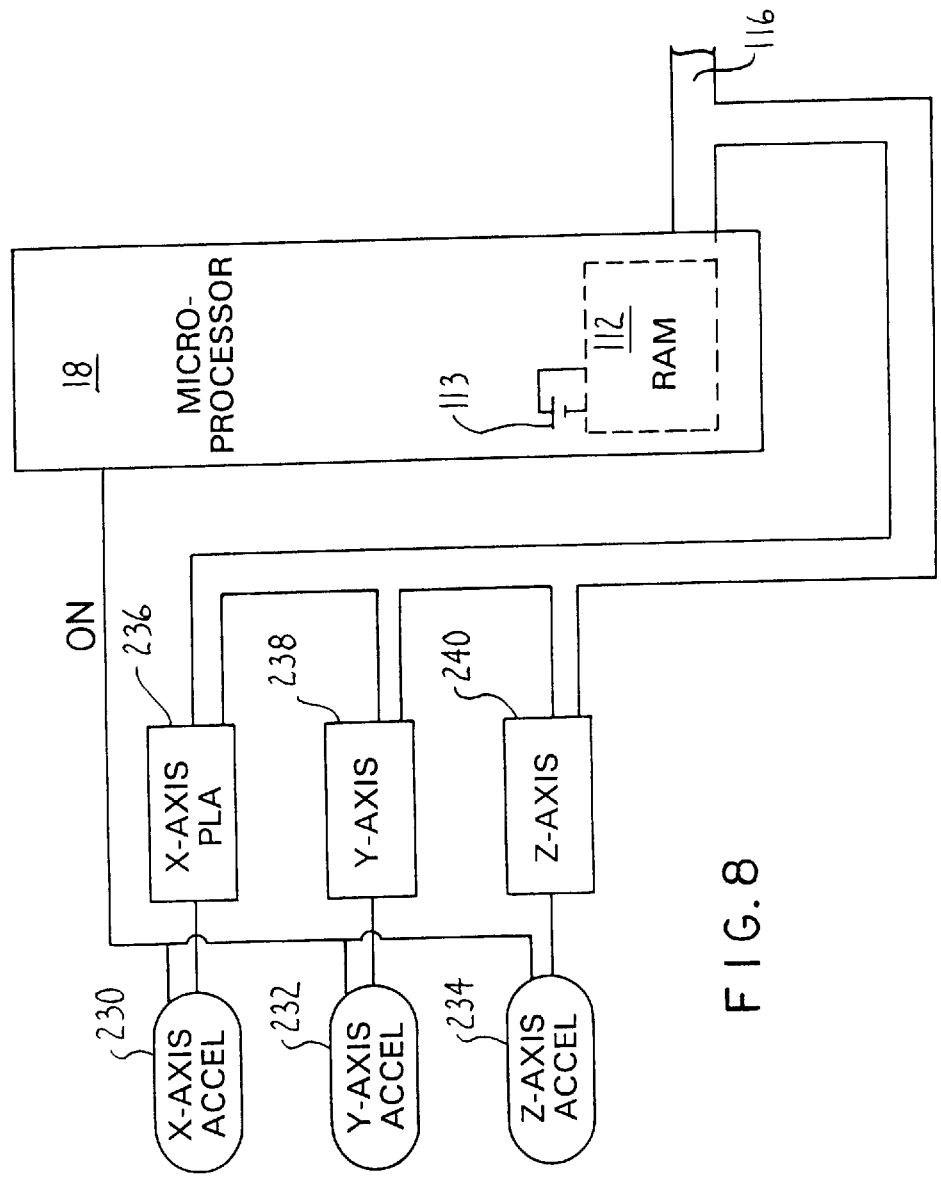
FIG. 8 is a schematic drawing illustrating an alternative transducer arrangement for the learning and assessment aid.

FIG. 8 is a block diagram of a portion of an alternative internal circuit for the learning and assessment aid 10 of this invention. In this circuit, the gyroscope is replaced by a set of an accelerometers 230, 232 and 234. Each accelerometer 230, 232, 234 measures the acceleration of the learning and assessment aid along a different axis. Associated with each accelerometer 230, 232 and 234 is a PLD 236, 238 and 240, respectively. The signals from each accelerometer is provided to the associated PLD, which, in turn generates data representative of either the speed of the learning and assessment aid or of the displacement of the learning and assessment aid. If the PLDs 236, 238 and 240 generate speed data, this data is then integrated by microprocessor 18 to obtain the displacement data. If the PLDs generate displacement data, the displacement data is forwarded directly to the microprocessor 18.

In this version of the invention the power consumption of the accelerometers is regulated by an ON signal that is selectively asserted by microprocessor 18. While a common ON signal is shown as being asserted to each accelerometer 230, 232 and 234, each accelerometer could be selectively actuated as a function of the motion the learning and assessment aid 10 being used to monitor. This would even further minimize the power consumption of the learning and assessment aid.

An advantage of the learning and assessment aid 10 employing the circuitry of FIG. 8 is that the aid, in addition to providing the veer and pitch data regarding the motion of the learning and assessment aid, also provides data regarding the displacement of the learning and assessment aid 10 from its initial location. For all types of testing, this eliminates the need to enter data regarding the individual's empirically derived rate-of-motion. This embodiment of the invention will measure the extent a person sidesteps off a straight-line path of travel.

It should be recognized that the foregoing descriptions are directed to specific versions of this invention and that other versions of this learning and assessment aid 10 may have different constructions. For example, in some versions of the invention, during a straight-line test, microprocessor 18 may employ the pitch data as a further variable to facilitate the generation of filtered veer data that represents the individuals movement along a travel center line. One such algorithm that may be employed to perform such filtering is:

$$CH = OH + HC + (C * \Delta t)$$

Where:
CH is the current heading
OH is the old heading
C is the compensation factor
$\Delta t$ is the sampling period (seconds)

The compensation factor is calculated according the following formula:

$$C = K^* \tan(\text{pitch})$$

Where:
K is a constant that accounts for pendulosity and angular momentum.

The current heading value is the right/left veer value that is then subjected to veer filtering. This filtering to correct for pitch induced variations in the veer value may be desirable in situations where the learning and assessment aid is used for extended periods of time, for example for a period exceeding 5 minutes in length. This filtering may also be desirable when the learning and assessment aid 10 is used with an individual 12 traversing either an inclined surface or stepped surface.

Still other versions of the learning and assessment aid 10 may employ transducer combinations different from what has been described. For example, it may be desirable to employ the described gyroscope 16 to provide an indication of the rotation and veer of the learning and assessment aid 10 and a single accelerometer that functions as the sensor of a pedometer that measures the forward/reverse displacement of the learning and assessment aid. Fiber optic gyroscopes, solid state gyroscopes, piezoelectric gyroscopes or magnetometers may be employed as the transducers that provide signals representative of the displacement of the learning and assessment aid along one or more axes of movement.

Moreover, it may be desirable to provide more complex protocols for receiving commands from the individual 12 using the learning and assessment aid. For example, it may desirable to configure the microprocessor 18 to receive command signals from the keyboard encoder 98 even before the audible instructions requesting the commands are generated. Thus, once an individual uses the aid 10 a number of times and knows what commands are expected, he/she will not have to spend time waiting for the instructions to be generated prior to entering the required commands.

Similarly, it may be desirable to configure the system so that multiple depressions of a particular button, for example the "*" button, will cause the learning and assessment aid 10 to back up a multiple number of steps. Thus, even after step 142 or a corresponding command confirm step has been executed, the individual can "back up" the execution of a test in order to correct a previously incorrectly entered command.

Moreover, while the system is in the debug mode, it is possible to reconfigure some of the features of the system. For example it may be possible to reset the "FF" filter factor in the algorithm employed to filter the measure of rotation (veer) during the straight-line test. Thus, this factor can be reset as may be desirable for each individual using the learning and assessment aid 10.

Furthermore, the learning and assessment aid may be configured to facilitate tests different from what has been described. For example, during turn testing an individual can be prompted to enter an indication of the extent he/she wants to turn, for example, 90°. Then, if the individual exceeds the programmed amount by a given value, the learning and assessment aid 10 will generate an appropriate message.

Moreover, it may further be desirable to provide the learning and assessment aid 10 with memory capable of storing data about the individuals using the aid. This could make it possible to facilitate the storage of information regarding the use of the aid 10 by individuals so this data can be later downloaded to a an external data storage device.

Alternatively, this would also make it possible to configure the aid 10 so that each individual using the aid would have a personal identification number (PIN). Based on the entry of the PIN, the learning and assessment aid could configure itself to for a particular test, for example, a straight line test for 20 seconds with a maximum of 15° of veer.

The learning and assessment aid 10 of this invention could also be configured to allow a visually impaired instructor use the device with a student. It may be desirable to so configure the aid 10 so that when it is operated in the data collection mode the speech generator will provide an audible message containing the data regarding the assessment of the individual. This report could be generated through the headset worn by the instructor so that he/she could record the assessment data and without providing feedback to the student. In order to facilitate such use, it may be desirable to provide the device with two earphone jacks or a wireless communications link.

Thus, it is the object of the appended claims to cover all such modifications and variations as come within the true spirit and scope of the invention.

The embodiments of the invention in which an exclusive property or privilege is claimed are defined as follows:

1. A learning aid for use by a visually impaired individual, said learning aid including:

a housing, said having a clasp for securing said housing to an article of clothing worn by the individual;

a first motion-sensitive transducer mounted in said housing, said first motion-sensitive transducer being configured to generate rotational displacement signals representative of the rotational movement of said housing;

a data entry unit attached to said housing for allowing the individual to enter commands thereto, said data entry unit configured to generate user command signals in response to the commands entered by the individual;

a speaker mounted in said housing and a speech generator disposed in said housing that is attached to said speaker for generating audible messages through said speaker, said speech synthesizer being configured to cause the generation of audible speech in response to the receipt of speech command signals; and a processor disposed in said housing, said processor being connected to said first motion-sensitive transducer for receiving said rotational displacement signals, to said data entry unit for receiving said command signals and to said speech generator for transmitting said speech command signals thereto, said processor being configured to: calculate a cumulative rotational displacement of said housing from an initial position based on said rotational-displacement signals; and, based on said command signals received from said data entry unit and said cumulative rotational displacement of said housing, generate speech command signals to said speech synthesizer so as to cause said speaker to produce audible messages regarding the displacement of said housing relative to the initial position.

2. The learning aid of claim 1, wherein said processor is further configured to: receive a plurality of distinct sets of said user command signals from said data entry unit; after a first set of said user command signals are received, to only generate speech command signals to cause the generation of audible message regarding the displacement of said housing after a final command signal is received; and after a second set of said user command signals is received, to continually compare the cumulative rotational displacement of said housing to a maximum rotational displacement value, and if said cumulative rotational displacement exceeds the maximum rotational displacement value, to generate speech command signals to cause the generation of an audible message indicating that the maximum rotational displacement value has been exceeded.

3. The learning aid of claim 1, wherein:

said data entry unit is configured to generate user commands signals representative of an individual-entered maximum rotational value and an individual-entered test duration; and said processor is further configured to: compare said cumulative rotational displacement to the individual-entered maximum rotational value based on said user command signals; to monitor the length of a monitoring period from a start mark; to compare the length of the monitoring to the individual-entered test duration; if, the cumulative rotational displacement exceeds the individual-entered maximum rotational value, to generate said speech signals so as to cause a first audible message to be generated; and if, said length of monitoring period equals said test duration without the cumulative rotational displacement value exceeding the individual-entered maximum rotational value, to generate said speech signals so as to cause a second audible message to be generated.

4. The learning aid of claim 3, wherein:

said data entry unit is configured to generate user command signals representative of an individual-entered time for monitoring rotational displacement; and said processor is further configured to: set said cumulative rotational displacement value to zero and generate speech command signals that cause an audible start command to be generated; perform said comparison of said cumulative rotational displacement to the individual-entered maximum rotation after said audible start command is generated; monitor the total time since the generation of the audible start command; and, if said total time is equal or greater than the individual-entered test time and the cumulative rotational displacement is less than said individual-entered maximum rotation, to generate a speech command signal to cause the generation of an audible congratulatory message.

5. The learning aid of claim 3, wherein:

said data entry unit is configured to generate user command signals representative of an individual-entered test distance for monitoring rotational displacement; and said processor is further configured to: set said cumulative rotational displacement value to zero and generate speech command signals that cause an audible start command to be generated; perform said comparison of said cumulative rotational displacement to the individual-entered maximum rotation after said audible start command is generated; monitor the total distance the individual has moved; and, if said total distance is equal or greater than the individual-entered test distance and the cumulative rotational displacement is less than said individual-entered maximum rotation, to generate a speech command signal to cause the generation of an audible congratulatory message.

6. The learning aid of claim 5, further including:

a second motion-sensitive transducer mounted in said housing for monitoring forward and reverse displacement of said housing, said second motion-sensitive transducer being configured to generate distance displacement signals representative of the displacement of said housing; and wherein said processor is connected to said second motion-sensitive transducer for receiving said distance displacement signals and is further configured to monitor the total distance the housing has moved based on said distance displacement signals.

7. The learning aid of claim 1, wherein said processor is further configured to generate speech command signals that cause audible instructions to be generated that inform the individual of the commands that are to be entered through said data entry unit.

8. The learning aid of claim 1 wherein said clasp is configured to allow said housing to be adjustably positioned relative to the article of clothing to which said housing is attached.

9. The learning aid of claim 1, wherein:

said first motion sensitive transducer is a gyroscope; and said clasp is configured to allow said housing to be adjustably positioned relative to the article of clothing to which said housing is attached.

10. The learning aid of claim 9, wherein said clasp includes: a clasp plate that is pivotally attached to said housing and that is provided with a fastening member for securement to the article of clothing; a leveling plate that is pivotally secured to said clasp plate; and an attachment assembly for securing said leveling plate at a plurality of positions to said housing.

11. The learning aid of claim 1, wherein:

a battery is disposed in said housing;

said first motion-sensitive transducer is connected to said battery for receiving an energization current therefrom and is selectively actuated by said processor;

said processor is configured to actuate said first motion-sensitive transducer after generating a speech command signal to cause said speaker to produce an audible announcement of a beginning of a test and to deactuate said first motion-sensitive transducer at the end of the test.

12. The learning aid of claim 11, wherein said processor is configured to receive from said data entry unit a specific user command signal that signifies the end of the test.

13. The learning aid of claim 11, wherein said processor is configured to consider the test to be ended when a said cumulative rotational displacement exceeds a maximum rotational displacement.

14. A method of training a visually impaired individual to develop desirable locomotion habits, said method including the steps of:

fitting the individual with a housing, said housing including: a rotational motion sensor; a speaker for generating instructions and information; and a data entry unit for allowing the individual to enter user commands;

having the individual enter user commands regarding specific ambulatory motions through said data entry unit in response to audio instructions generated by said speaker;

monitoring the rotational movement of said housing and the individual with said rotational motion sensor;

generating audible information over said speaker regarding the movement of the individual in response to said monitoring of rotational movement and said user commands entered by the individual.

15. The method of claim 14, further comprising the steps of:

the individual entering through said data entry unit a user command indicating that a turning test is desired;

generating a start sound through said speaker;

monitoring the cumulative rotation of said housing and the individual with said rotational-motion sensor after said start sound is generated;

the individual entering through said data entry unit a stop command; and generating an audible message through said speaker reporting the cumulative rotation of said housing and the individual.

16. The method of claim 15, further comprising the steps of:

after said generation of said start sound, actuating said rotational motion sensor; and after said generation of said stop command, deactuating said rotational motion sensor.

17. The method of claim 14, further comprising the steps of:

the individual entering through said data entry unit a first user command indicating that a straight-line motion test is desired and a second user command indicating the maximum veer that is to occur;

generating a start sound through said speaker;

monitoring the cumulative rotation of said housing and the individual with said rotational-motion sensor after said start sound is generated;

comparing said cumulative rotation to the individual entered maximum veer; and if, said cumulative rotation exceeds the user-entered maximum veer, generating an audible message through said speaker informing the individual that the individual-entered maximum veer has been exceeded.

18. The method of claim 17, further including the steps of:

the individual entering through said data entry unit a user entered command representative of the duration of the straight-line motion test;

monitoring the time elapsed after said generation of said start sound; and if, said cumulative rotation exceeds the individual-entered maximum veer before the elapsed time exceeds the individual entered test duration, generating an audible message through said speaker indicating when the individual-entered maximum veer was exceeded.

19. The method of claim 18, further including the steps of:

after said generation of said start sound, actuating said rotational motion sensor; and after the elapsed time exceeds the individual entered test duration or after said cumulative rotation exceeds the individual entered maximum veer, deactuating said rotational motion sensor.

20. The method of claim 16, further including the steps of:

the individual entering through said data entry unit a user command representative of the distance of the straight-line motion test;

monitoring the distance said housing and the individual move after said start sound is generated;

if, said cumulative rotation exceeds the individual-entered maximum veer before said housing and the individual move a distance equal to the individual-entered distance, generating an audible message through said speaker indicating the distance at which the individual-entered maximum veer was exceeded.

21. The method of claim 18, wherein said step of monitoring the distance said housing and the individual move is performed with a displacement sensor mounted in said housing.

22. The method of claim 20, further including the steps of:

after said generation of said start command, actuating said rotational motion sensor; and after the measured distance exceeds the individual-entered test distance or after said cumulative rotation exceeds the individual entered maximum veer, deactuating said rotational motion sensor.

23. The method of claim 14, wherein said rotational motion sensor is sensitive to the position of said housing relative to a ground plane, and further including the step of leveling said housing relative to the ground plane.

24. A method of assessing the locomotion habits of an individual, said method including the steps of:

fitting the individual with a housing, said housing including: a motion transducer for generating displacement signals representative of the displacement of said housing; a data recorder connected to said motion transducer for receiving the displacement signals and for generating data representative of the cumulative displacement of said housing; a display connected to said data recorder for displaying data representative of the cumulative displacement of said housing; and a speaker;

generating through said speaker an audible command instructing the individual to engage in locomotion;

monitoring the displacement of the individual by having said motion transducer monitor the displacement of said housing and determining the cumulative displacement with said data recorder;

terminating said monitoring of the displacement of the individual by said motion transducer;

generating through said speaker a command directing the individual to cease locomotion; and presenting on said display indication of the cumulative displacement of the individual and the housing.

25. The method of training of claim 24, wherein said motion transducer is configured to monitor the rotation of the housing and the individual from a center axis and said data recorder is configured to generate an indication of the cumulative veer of the individual from the center axis.

* * * * *